(12) United States Patent
Astratov

(10) Patent No.: US 11,762,214 B2
(45) Date of Patent: Sep. 19, 2023

(54) SUPER-RESOLUTION MICROSCOPY METHODS AND SYSTEMS ENHANCED BY ARRAYS OF SUPERLENSES WITH WIDE FIELD-OF-VIEW

(71) Applicant: Vasily N. Astratov, Charlotte, NC (US)

(72) Inventor: Vasily N. Astratov, Charlotte, NC (US)

( * ) Notice: Subject to any disclaimer, the term of this patent is extended or adjusted under 35 U.S.C. 154(b) by 326 days.

(21) Appl. No.: 17/143,445

(22) Filed: Jan. 7, 2021

(65) Prior Publication Data
US 2021/0208414 A1    Jul. 8, 2021

Related U.S. Application Data

(60) Provisional application No. 62/957,998, filed on Jan. 7, 2020.

(51) Int. Cl.
*G02B 27/58* (2006.01)
*G02B 21/33* (2006.01)
*G02B 21/34* (2006.01)

(52) U.S. Cl.
CPC .............. *G02B 27/58* (2013.01); *G02B 21/33* (2013.01); *G02B 21/34* (2013.01)

(58) Field of Classification Search
CPC ........ G02B 27/58; G02B 21/33; G02B 21/34; G02B 21/367; G02B 21/16; G02B 21/26; G02B 21/0076; G02B 21/365; G02B 21/06; G02B 21/0032; G02B 21/02; G02B 21/361; G02B 21/008; G02B 21/002; G02B 21/0072; G02B 21/14; G02B 21/0088; G02B 21/0036; G02B 21/24; G02B 21/32; G02B 21/362; G02B 21/245;

(Continued)

(56) References Cited

U.S. PATENT DOCUMENTS 5,771,321 A * 6/1998 Stern .................. G02B 6/35
385/48
9,362,324 B1 6/2016 Astratov et al.
(Continued)

OTHER PUBLICATIONS

Allen et al., "Super-resolution microscopy by movable thin-films with embedded microspheres: Resolution analysis" Received Jan. 2, 2015, revised Jul. 16, 2015, Published online Aug. 14, 2015.

(Continued)

*Primary Examiner* — Mustak Choudhury
(74) *Attorney, Agent, or Firm* — Clements Bernard Walker; Christopher L. Bernard

(57) ABSTRACT

A super-resolution optical imaging method and system, including: providing a periodic monolayer array of dielectric spheres or cylinders with a sufficiently small period such that the fields-of-view produced by the spheres or cylinders overlap providing an enlarged field-of-view; wherein the dielectric spheres or cylinders are fixed in their positions such that the array is adapted to be brought adjacent to a sample to be optically imaged as a whole; and applying pressure to the array to reduce a gap separating the dielectric spheres or cylinders from the sample to achieve super-resolution imaging with the enlarged field-of-view. The super-resolution optical imaging method and system further comprising positioning the dielectric spheres or cylinders adjacent to one another in the array by air suction through a periodic micro-hole array providing a monolayer arrangement with a negligible defect rate.

18 Claims, 5 Drawing Sheets

(58) Field of Classification Search
CPC .............. G02B 21/0056; G02B 21/36; G02B 21/0008; G02B 21/086; G02B 21/241; G02B 21/082; G02B 13/22; G02B 26/06; G02B 27/40; G02B 27/425; G02B 3/14; G02B 2207/113; G02B 26/101; G02B 27/0037; G02B 27/30; G02B 5/3083; G02B 5/005
See application file for complete search history.

(56) References Cited

U.S. PATENT DOCUMENTS

| | | | | |
|---|---|---|---|---|
| 9,835,870 | B2* | 12/2017 | Astratov | G02B 5/008 |
| 2010/0245816 | A1* | 9/2010 | Shen | G01Q 30/02 |
| | | | | 356/301 |
| 2018/0372476 | A1* | 12/2018 | Kassamakov | G01B 9/02035 |
| 2019/0025510 | A1* | 1/2019 | Goddard | G02B 6/107 |
| 2020/0186710 | A1* | 6/2020 | Sheikh | H04N 23/667 |

OTHER PUBLICATIONS

Darafsheh et al., "Optical super-resolution imaging by high-indexmicrospheres embedded in elastomers", Department of Radiation Oncology, University of Pennsylvania, Philadelphia, Pennsylvania 19104, USA, Jan. 1, 2015 / vol. 40, No. 1 / Optics Letters.

Bezryadina et al., "Localized plasmonic structured illumination microscopy with an optically trapped microlens", Journal, Nanoscale, 2017, 9, 14907.

Brettin et al.,"Enhancement of resolution in microspherical nanoscopy by coupling of fluorescent objects to plasmonic metasurfaces", Appl. Phys. Lett. 114, 131101 (2019); https://doi.org/10.1063/1.5066080.

Abolmaali et al., "Photonic jets for highly efficient mid-IR focal plane arrays with large angle-of-view",1Department of Physics and Optical Science, Center for Optoelectronics and Optical Communications, University of North Carolina at Charlotte, Charlotte, NC 28223-0001, USA 2Air Force Research Laboratory, Sensors Directorate, Wright Patterson AFB.

* cited by examiner

SUPER-RESOLUTION MICROSCOPY METHODS AND SYSTEMS ENHANCED BY ARRAYS OF SUPERLENSES WITH WIDE FIELD-OF-VIEW

CROSS-REFERENCE TO RELATED APPLICATION

The present disclosure claims the benefit of priority of U.S. Provisional Patent Application No. 62/957,998, filed on Jan. 7, 2020, and entitled "ARRAYS OF SUPERLENSES FOR SUPER-RESOLUTION OPTICAL IMAGING WITH WIDE FIELD-OF-VIEW," the contents of which are incorporated in full by reference herein.

TECHNICAL FIELD

The present disclosure relates generally to microscopy methods and systems. More specifically, the present disclosure relates to super-resolution microscopy methods and systems enhanced by arrays of superlenses with wide field-of-view.

BACKGROUND

The diffraction limit was introduced at the end of the 19th century by several prominent scientists, including Abbe, Helmholtz, and Raleigh, and it stated that the far-field resolution of optical systems is limited at a $\sim\lambda/(2n)$ level, where $\lambda$ is the operating wavelength in a medium with the refractive index n. The most important biomedical objects, such as subcellular structures, viruses, and proteins have characteristic dimensions smaller than the diffraction limit, which stimulated huge interest in developing microscopy with better than diffraction-limited resolution, termed super-resolution microscopy. There are many methods of super-resolution microscopy which can be divided in two main groups, fluorescence (FL) and label-free super-resolution microscopies. The resolution of methods based on staining biomedical samples with FL dyes can be higher than the classical diffraction limit due to certain optical nonlinear properties in such methods as stimulated emission depletion (STED) microscopy or due to statistical properties of single molecule emission in the case of localization microscopy. Due to very strong contrast mechanisms and extreme sensitivity up to a single molecule level, these techniques became a method of choice in biomedical studies. Although the resolutions available in these methods go far beyond the classical diffraction limit, these methods also have drawbacks. The speed of FL imaging can be rather slow because of the relatively weak signals. The FL intensity dims over time because the fluorophore is being degraded by light (photobleaching). In addition, FL labeling may induce undesirable effects, like photo-toxicity. Besides, labeling itself may be difficult for some specimens.

Label-free microscopy, which does not require sample staining, is a desirable option and it is in high demand for an even wider range of applications than FL microscopy. However, such label-free microscopy relies on subtler light-scattering processes in nanoscale objects, resulting in lower effective image contrasts. It can be divided into several groups: a) interference detection techniques where the lateral resolution is diffraction-limited, but the axial (and temporal) resolution can be extremely high, b) optical nonlinear methods where super-resolution is obtained at the expense of high photoexcitaton levels, which is typically not a desirable option in biomedical imaging, c) far-field super-lenses and hyperlenses made from advanced plasmonic and metamaterials with engineered dispersion relations for their elementary excitations, d) imaging through contact dielectric micro-lenses, first of all through micro-spheres often used in combination with additional nanoplasmonic arrays, and e) methods related to information theory used in combination with novel ways of illumination of samples and/or collection of optical information. One of the examples of the latter group of methods is a superoscillatory lens.

Super-resolution imaging through contract micro-spheres emerged several years ago as an unprecedentedly simple method of white light microscopy with a 2-3 times higher resolution as compared to standard microscopy. The comparison of this method with conventional microscope imaging is illustrated in FIG. 1. It is equally suitable for label-free and FL imaging of biomedical samples and nanoscale structures. Dielectric micro-spheres placed in contact with the object produce a magnified virtual image with some contribution of the object's optical near-fields. The resolution can be estimated based on a solid immersion lens principle as $\sim\lambda/(2n)$, where n is the index of micro-sphere (in the case of barium titanate glass micro-spheres $n\sim2$ leading to a resolution $\sim\lambda/4$). However, the use of additional nanoplasmonic arrays in contact with the objects allows increasing the resolutions up to $\sim\lambda/7$. The theoretical mechanisms of super-resolution imaging through dielectric micro-spheres represent a subject of active research in recent years.

There are several patents devoted to super-resolution imaging through dielectric micro-spheres. Two main advancements took place in this area in recent years. First was a proposal to use high-index (n>1.7) micro-spheres which can be liquid-immersed or embedded in elastomeric coverslips. It opened a way of imaging biomedical samples since they are usually in a liquid phase. Second was a proposal to use nanoplasmonic arrays in contact with the object. Due to coupling of object's radiation to the adjacent nanoplasmonic arrays the resolution at the level of $\sim\lambda/7$ exceeding solid immersion lens limit became possible. Several other advantages of this method include: a) its ability to provide both FL and label-free imaging, b) simplicity, c) high speed (millisecond range similar to conventional microscopy), and d) ease of integration with other techniques, such as confocal imaging, structured illumination microscopy, and interferometric detection methods.

At the same time, applications of a micro-sphere-super-lens to biomedical imaging revealed a certain drawback of this method. Due to spherical aberrations, only a central part of the virtual image produced by the individual micro-sphere appears with sufficiently high quality. Actually, only this central part near the point where the sphere touches the object is visible since the area outside this central circle appears too dark and out of focus. This factor severely limits FOV by approximately quarter of the sphere diameter. Considering that the typical sphere diameters used in this method are in 4-40 µm range, FOV can be estimated to be in 1-10 µm range that is not sufficient in practice.

In order to scan larger areas of the samples, different groups suggested several methods of translating micro-spheres: (a) embedding high-index micro-spheres in PDMS or plastic coverslip and translating the whole coverslip that simplify inspection of large areas of the samples, (b) gluing the micro-sphere to the tip of the atomic force microscope (AFM), raster-scanning of the sample, and stitching the virtual images, as well as using optical tweezers.

However, all these methods have their own drawbacks. The use of the coverslips containing randomly positioned micro-spheres makes it difficult to align individual spheres with the objects. At small concentration of micro-spheres, they tend to form compact close-packed clusters separated by long distances. An attempt to increase the size of these close-packed clusters by increasing the concentration of micro-spheres results in defects, interstitial micro-spheres, and, eventually, in assembling micro-spheres in the second layer located above the first layer that creates a problem for imaging. Use of the AFM tip for translating micro-spheres is rather expensive option which is not widely available. Use of optical tweezers involves many factors which limit the motion of micro-spheres. In general, raster-scanning by using additional equipment such as AFM in the case (b) or optical tweezers in the case (c) significantly complicates the optical microscopy setup.

To summarize, the advantage of the initial proposal of imaging through randomly positioned liquid-immersed high-index micro-spheres was in its simplicity. However, precise translation of individual micro-spheres seriously complicates the experimental setup. In this regard, the coverslips with embedded spheres can in principle be still relatively simple in use, however practical realization of such imaging is complicated due to sparse arrangement of self-assembled micro-spheres. Sometimes small clusters of touching micro-spheres can be obtained as a result of self-assembly. Using these small clusters instead of individual micro-spheres can be promising, but because of their random position and size, using them for imaging is not simple in practice. On the other hand, an attempt to increase the concentration of spheres in order to increase the size of such clusters did not work out since instead of a single monolayer, the excess micro-spheres form the second and third layers on top of the first layer, thus destroying imaging conditions. This situation requires additional tools providing precise translation and alignment of individual spheres with the nanoscale objects of interest that complicate the experimental setup and require specially trained staff to operate such microscope systems. In addition, one more disadvantage of this method has been revealed in the previous studies. In the process of translation of coverslips along the surface, it is difficult to control the nanoscale gap separating the embedded micro-spheres from the objects. However, this gap needs to be minimized in order to achieve super-resolution imaging. To collect the optical near-fields from the object, the gap separating closest micro-sphere from the object should be smaller than $\lambda/4$ or, at least, $\lambda/2$. This requirement creates a problem for the practical use of moving coverslips. How to translate them and still retain super-resolution imaging is the problem to be overcome.

SUMMARY

In this disclosure, systems and methods are provided for super-resolution imaging based on using large-scale, perfectly ordered, single monolayer arrays of dielectric micro-spheres or microcylinders. The proposed method is illustrated in FIG. 2. The power of this approach is such that it essentially turns these coverslips into a component with the novel optical properties. On the fabrication level, besides a perfect quality of ordering, the novel feature is an ability to preserve well-controlled separations between the micro-spheres in the large-scale arrays. In contrast, previously used techniques of self-assembly can produce only close-packed clusters or small-scale arrays where micro-spheres were assembled in a touching position. New capability to preserve well-controllable separations between the micro-spheres allows controlling the overlap (or separations) between the virtual images produced by the individual micro-spheres. The advantage of this approach stems from a huge FOV provided by such optical component. Instead of imaging through just few micro-spheres, it provides parallel imaging through thousands of micro-spheres with strictly periodic locations. The objects of interest can be visualized through such optical components with a single application of such coverslip using (if needed) only small adjustments of its position within a half period of the array. This means that a few micron-scale displacements of the coverslip would be sufficient for optimizing the quality of the super-resolved image of the object of interest.

The expected optical properties of such coverslips can be anticipated by comparing conventional microscope imaging or imaging through individual contact micro-sphere illustrated in FIG. 1 with the virtual imaging obtained through such perfectly ordered array of high-index micro-spheres embedded in a coverslip, as illustrated in FIG. 2. The magnification (M) of the virtual images is usually between 3 to 4 times. If one takes as an illustration M=4 and considers that the size of the super-resolved area is close to the quarter of the sphere diameter, it means that for touching micro-spheres the super-resolved areas visible at their virtual imaging plane represent touching circles centered with the corresponding micro-spheres and having diameters at the virtual plane equal to the diameters of these micro-spheres. Thus, the coverage of the virtual plane with these circles can be easily estimated based on a geometrical model of circle packing. For a square array of micro-spheres, this factor is equal to 78.5%. The densest packing of circles in the plane is the hexagonal array where the area fill factor with circles can be increased up to 90.7%. Although these are relatively large numbers, one should consider that the fraction of the total super-resolved area at the real physical surface of the sample would be approximately 16 times less due to M=4. This means that the fraction of the super-resolved area occupied at the real physical surface is close to ~4.9% for a square and ~5.7% for hexagonal arrays, respectively. Although these fractions can be viewed as relatively insignificant we should consider two factors which are extremely important in evaluation of practical significance of the proposed technology. The first is related to the overall physical size of the imaged area. Tens of thousands of micro-spheres can be packed in perfectly (or almost perfectly) ordered arrays. Considering typical sizes of micro-spheres in 4-40 μm range, one can estimate that for 100×100 arrays, the dimensions of the super-resolved area can vary from 0.4×0.4 mm² up to 4×4 mm² area. This is a significant improvement of the original technology of imaging through individual micro-spheres which is absolutely critical for such applications as histological analysis and diagnostics of the medical samples in a hospital environment. The second factor is related to the fact although after single application of the coverslip only about 5% of the millimeter-scale area of the sample would be imaged with optical super-resolution, it is technically relatively easy to provide super-resolution imaging of much larger fraction of the sample by applying a gentle pressure on the coverslip towards investigated sample and providing very small share action on the coverslip causing its very small tangential shifts within a narrow range limited by the half of the period of the array. In the case of application in histological analysis, as an example, such gentle pressure and small shifts can be exerted by the fingertips of a microscopy specialist performing histological analysis. It is important to note that this procedure would not imply the shift of the coverslip over long distances where it was difficult to minimize the separation between the micro-spheres and objects. Quite contrary, a slight shear action for the coverslip gently pressed into the tissue sample would be performed under conditions of minimized separation between the micro-spheres and objects. It would significantly increase, however, the fraction of the area of the sample available for super-resolution imaging. At this point, it is difficult to claim a precise number, but based on a limited experience, up a half of the total millimeter-scale area of biomedical sample would became available for super-resolution imaging.

The quantification of the optical resolution in the imaged areas can be performed based on a solid immersion lens concept. It shows that the virtual imaging through high-index (n~2) micro-spheres can be achieved with a maximal $\lambda/(2n) \sim \lambda/4$ resolution that is two times better than the resolution of the microscopes equipped with the most sophisticated and expensive objectives in air. It is important that this resolution could be achieved using much more basic and less expensive microscope objectives not requiring numerical aperture to be close to unity. However, this resolution does not represent the limit of this technology. The resolution capability can be further enhanced by using short-period nanoplasmonic arrays deposited on the surface of the sample substrates. In the latter case, the resolution on the order of $\sim\lambda/7$ was experimentally demonstrated for imaging dye-doped fluorescent nanospheres and F-actin proteins by using imaging through individual high-index micro-spheres. Thus, the proposed methods and systems provide super-resolution imaging of biomedical and other samples with unprecedentedly large, millimeter-scale FOV using standard microscopes available for example at the histology and pathology laboratories at hospitals and biomedical companies without switching to more complicated and significantly much more expensive super-resolution microscope systems such as stimulated emission depletion (STED) or localization (PALM/STORM) microscopes.

DETAILED DESCRIPTION OF ILLUSTRATIVE EMBODIMENTS

The present disclosure will now be described more fully hereinafter in the following detailed description of the disclosure, in which some, but not all embodiments of the disclosure are described. Indeed, this disclosure may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the disclosure. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the disclosure, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the disclosure and the claims.

Figure 1:
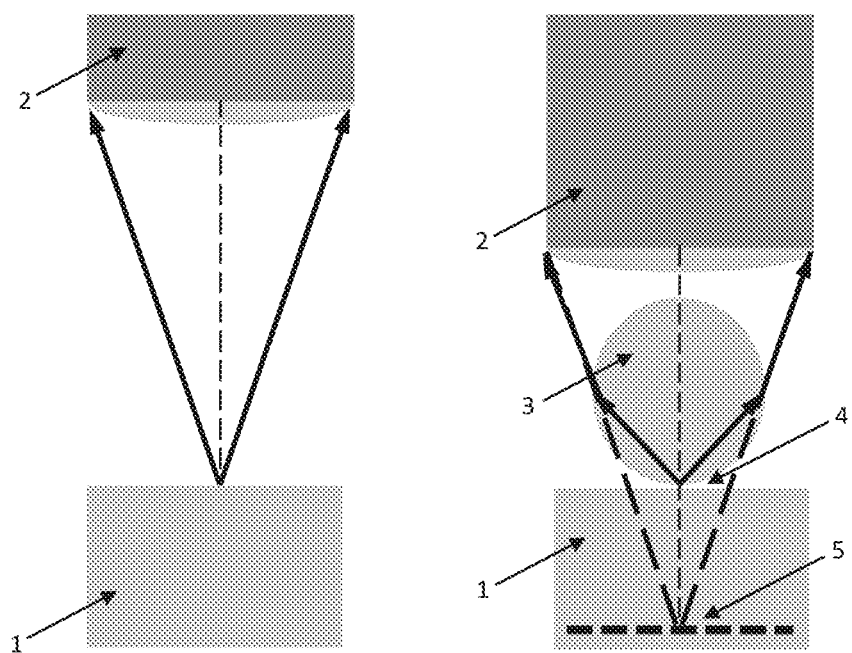
FIG. 1. is a schematic diagram illustrating a comparison of conventional microscopy (on the left) with the imaging through a contact micro-sphere (on the right): 1—substrate, 2—microscope objective, 3—dielectric micro-sphere, 4—point light source located at the point where the sphere touches the substrate, 5—virtual image of this light source created at some depth inside the substrate—the depth of the virtual image is illustrated by the dashed horizontal line.
Figure 2:
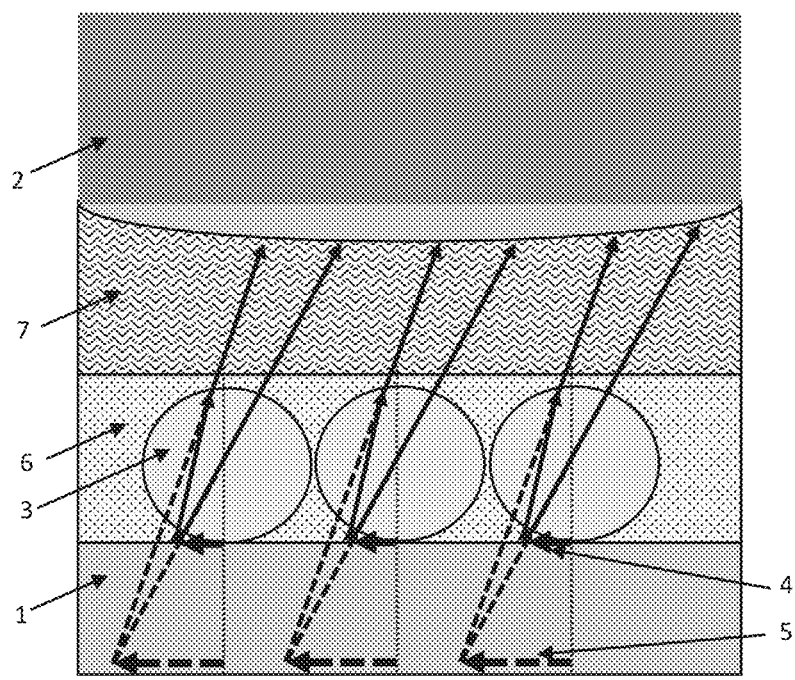
FIG. 2. is a schematic image illustrating the formation of a large FOV in the proposed systems and methods due to blending (or almost blending) virtual images produced by the individual high-index (n~2) micro-spheres embedded in a plastic coverslip: 1—substrate, 2—microscope objective, 3—high-index micro-spheres, 4—objects shown as horizontal arrows located at the surface of the substrate, 5—virtual images shown as horizontal dashed arrows located deeper in the substrate, 6—coverslip made from plastic, PDMS or other material, 7—liquid used for immersing the microscope objective (the image is made for the liquid-immersed microscope objective).
Figure 3:
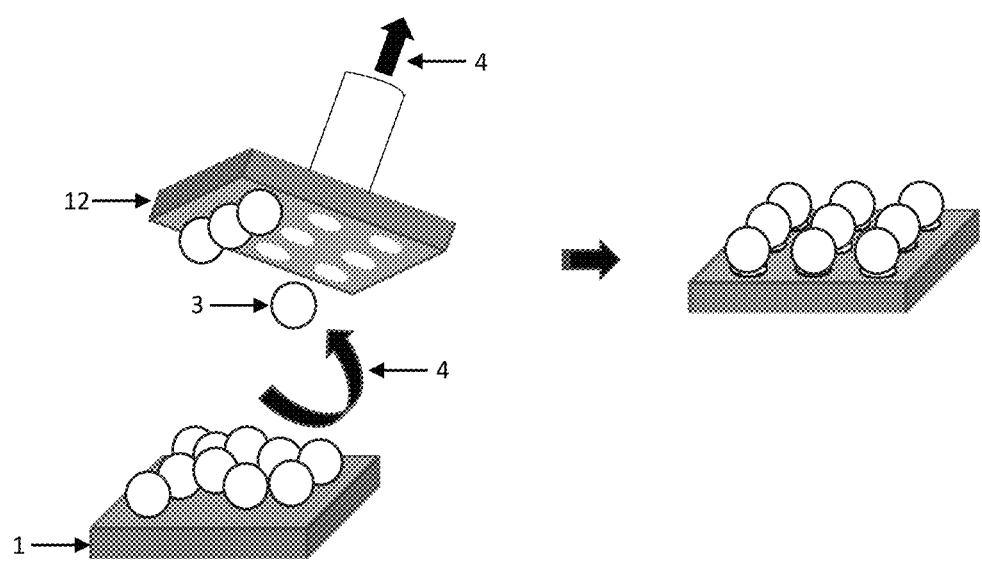
FIG. 3. is a schematic image illustrating method of large-scale assembly of micro-spheres at the positions determined by the openings in the micro-hole array due to air suction provided through these micro-holes: 1—substrate, 12—micro-hole array, 3—micro-spheres, 4—direction of air flow indicated by arrow—the image on the right shows a perfectly ordered array where each hole is filled with a micro-sphere.

The process of fabrication of coverslips containing large-scale, perfectly ordered, single monolayer arrays of embedded high-index dielectric micro-spheres is illustrated in FIG. 3. This is essentially a two-step fabrication process which includes: (a) assembling of the perfectly ordered arrays of micro-spheres using air suction through pre-fabricated arrays of micro-holes and (b) embedding thus obtained arrays of micro-spheres into coverslips. The first step of this process has been previously used for developing light-concentrating structure for mid-wave infrared (MWIR) focal plane arrays (FPAs). The second step has been used for fabricating coverslips for super-resolution imaging through high-index micro-spheres with random positions obtained by self-assembly. Two steps have never been combined previously. Both steps are considered below.

First step: Obtaining ordered arrays of micro-spheres by suction through micro-hole array. Micro-hole arrays can be obtained by different technologies. In previous work, a Bosch process was used for etching cylindrical holes completely through Si slab polished to a small thickness. It should be noted that this technology is rather complicated in practice and that the thin Si wafers with micro-hole arrays are fragile. Potentially a much better approach is represented by the micro-hole arrays fabricated by laser drill technology in stainless steel. The latter fabrication is fast, inexpensive, and suitable for mass production of micro-hole arrays with variable diameters and pitch sizes.

As shown in FIG. 3, a method of defect-free assembly of dielectric micro-spheres in an array of micro-holes is provided. In contrast to self-assembly, this is an example of forced assembly driven by air suction through micro-hole array. As seen in FIG. 3, the micro-spheres are lifted from the substrate by the air flux. As a result, each hole in the array of micro-holes is filled with a micro-sphere, and the interstitial micro-spheres can be easily blown away by an additional sideway air flux. A similar principle is well known for manipulation with individual objects in vacuum grippers or tweezers; however, it is in this work where this approach was used for assembling large-scale arrays of micro-spheres for the first time. Again, it is important to stress that this was done for developing light-concentrating structure for mid-wave infrared (MWIR) focal plane arrays (FPAs). This approach has never been used for super-resolution imaging applications.

FIG. 3 schematically illustrates the defect-free assembly in thus fabricated structures. Practical results of realization this technology show that 20×20 arrays of perfectly arranged micro-spheres without any defects can be obtained rather simply. For much larger arrays, a few missing spheres can be still found. However, all spheres except the few missing spheres are perfectly positioned and the interstitial spheres are completely removed by the additional sideway air flux. The rate of missing spheres in structures fabricated by this technology can be made smaller than 0.1%. This is sufficiently small concentration of missing spheres which does not represent problem for practical use of thus fabricated arrays for super-resolution imaging applications. It should also be mentioned that the defect rate in the proposed technology is significantly smaller (by more than an order of magnitude) as compared to any self-assembly techniques including the best methods of directed self-assembly. The best quality structures obtained by the methods of directed self-assembly have typical defect rates on the order of several percent which represent a problem for developing super-resolution imaging applications.

Second step: Embedding ordered arrays of micro-spheres in cellulose acetate coverslips. Previously, the embedding process was developed for randomly positioned micro-spheres using a mechanical press with a heater illustrated in FIG. 4. Transferring perfectly ordered array of micro-spheres sitting in the arrays of micro-holes requires some modification of the previously developed process. It can be achieved using a three-step procedure.

First, the stainless steel micro-hole array with the holes filled with micro-spheres is heated up to a plastic (such as cellulose acetate) coverslips softening temperature. Second, the plastic coverslip is lightly pressed into the array of micro-spheres, so that the spheres become permanently attached to coverslip with the position defined by the micro-hole array at the previous step. Finally, the micro-spheres are more deeply embedded in the coverslip under pressure at the plastic softening temperatures in a sandwich-type structure containing spacers made from a material (such as borosilicate glass) with much higher softening temperature.

Figure 4:
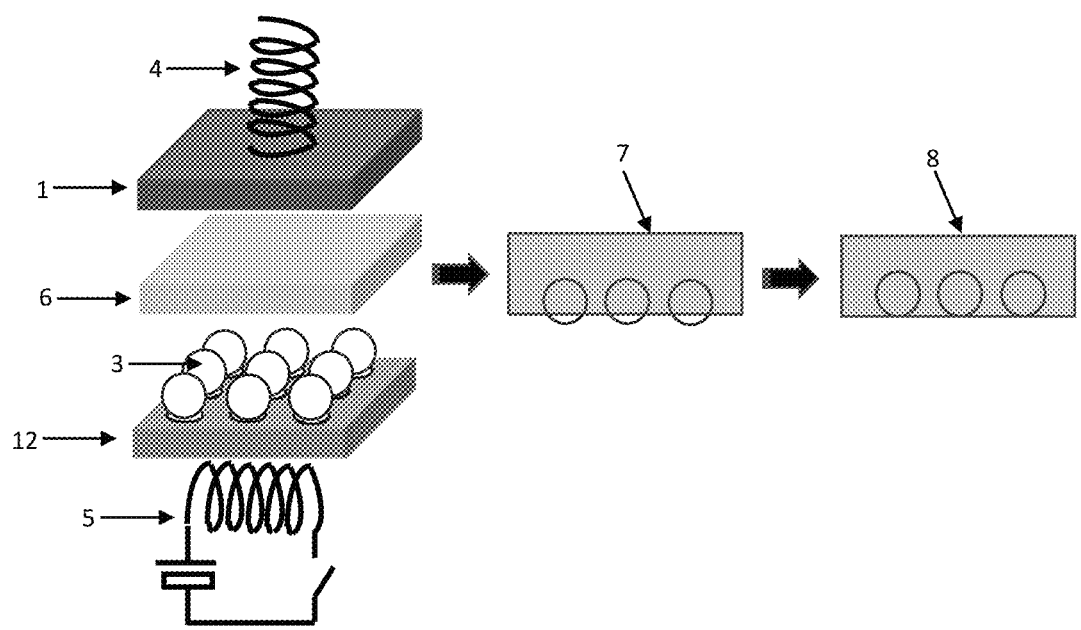
FIG. 4. is a schematic image illustrating the method of embedding micro-spheres in a plastic coverslip: 1—top plate of the thermal press used to provide a pressure on micro-spheres required for their embedding, 12—micro-hole array, 3—micro-spheres sitting in the holes, 4—spring used to provide a pressure from top down on the top plate of the thermal press, 5—heater providing a softening or melting temperature for the coverslip, 6—plastic (or other) coverslip, 7—coverslip with partly embedded and partly extending micro-spheres produced by this technology, 8—coverslip with completely embedded micro-spheres located close to the surface produced by this technology.

Depending on the temperature regimes of embedding and on the micro-sphere diameter, they can be fully incorporated inside plastic coverslip with the tips of the micro-spheres slightly extending from the coverslip, as schematically illustrated in FIG. 4. Alternatively, in the case of slightly lower embedding temperatures and larger spheres' diameters they can make dents in plastic coverslips schematically illustrated in FIG. 5. In both cases, it is desirable to realize conditions when the tips of micro-spheres are slightly extending from the surface (usually by less than ~1 μm).

The described procedure of embedding ordered arrays of microspheres in coverslips represents only one possibility. In fact, many other procedures not requiring use of thermal press can be envisioned. A simplest possibility is represented by fixing micro-spheres sitting directly in the openings of the micro-hole array using liquid or viscous substances with an ability to solidify. Examples of such substances are glues, epoxies, photoresists, polydimethylsiloxane (PDMS) or other similar substances. It shows that there is a plenty of technologies which can be used for fixing and embedding ordered arrays of micro-spheres. The description of all these technologies goes beyond the scope of this disclosure, but they are all included in this disclosure.

Figure 5:
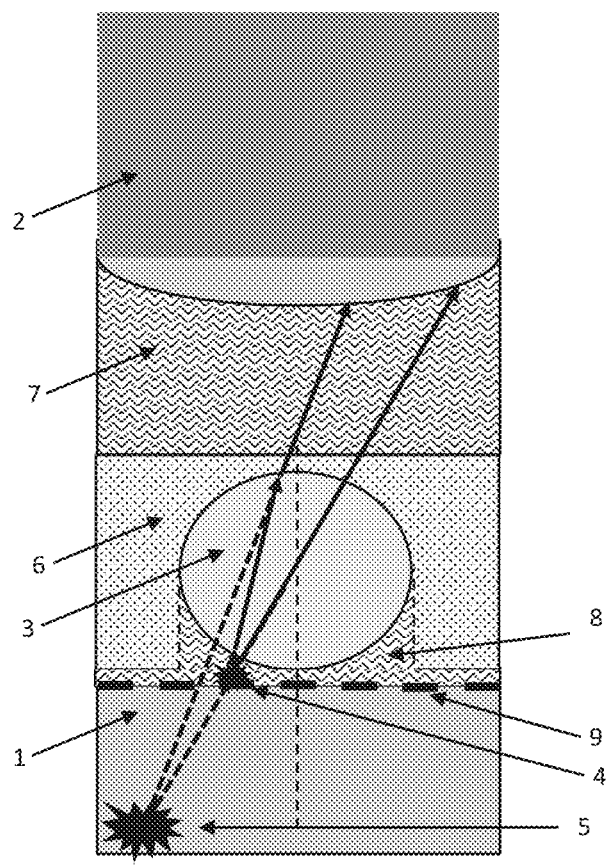
FIG. 5. is a schematic diagram illustrating a more advanced use of the proposed methods and systems where an additional short-period nanoplasmonic array on the surface of the substrate is used to increase the resolution further beyond the classical diffraction limit, illustrating a case when micro-spheres left openings in the coverslip as a result of embedding, which outcome usually takes place if the temperature of embedding is close to the softening (or even slightly lower) temperature and if larger micro-spheres are used, after embedding, such micro-spheres leave these opening which can be filled with a liquid containing investigated objects such as dye-doped FL nanospheres, F-actin proteins, cells and subcellular structures, etc.: 1—substrate, 2—microscope objective, 3—high-index dielectric micro-spheres, 4—FL objects which can be represented by nanospheres or biomedical nanostructures, 5—magnified virtual image of these objects located at some depth inside the substrate, 6—coverslip made from plastic or other material, 7—liquid filling the space between the coverslip and microscope objective (liquid-immersed microscope objective is illustrated), 8—opening in the coverslip left by the micro-sphere in the process of its embedding, which is filled with a liquid (such as water) containing investigated nanoscale objects, 9—short-period nanoplasmonic array such as made from gold with a nanoscale thickness is indicated by a horizontal dashed line at the surface of the substrate.

Once the array of microspheres is embedded in coverslip or otherwise fixed in the micro-hole array, these coverslips can be used in super-resolution microscopy as is schematically illustrated in FIG. 5. Both upright and inverted microscopes can in principle be used with the former case illustrated in FIG. 5. In this case, an additional illumination can be provided to visualize, as an example, dye-doped FL objects such as polystyrene nanospheres or F-actin proteins. As a possibility, the liquid suspension containing nanoscale objects can be deposited as a droplet on the substrate and the coverslip with embedded micro-spheres can be placed from the top in a close contact position, so that the space surrounding high-index micro-sphere is filled with the liquid. This is illustrated in FIG. 5 for the most advanced scenario when an additional nanoplasmonic array is fabricated on the surface of glass, semiconductor, or another substrate.

Thus, methods and systems for the super-resolution imaging based on using dielectric spheres (such as ball lenses or micro-spheres) or cylinders (such as microfibers) are widely used for visualizing biomedical and nanoscale structures with deeply subwavelength feature sizes (even below 100 nm). When placed in contact with the objects, such spheres or cylinders create magnified virtual or real images with participation of the objects' optical near-fields that allows to increase the resolution beyond the classical diffraction limit. The problem of these methods and systems is that the field-of-view (FOV) offered by individual spheres is rather small—not to exceed the quarter of their diameter—that requires a precise micromanipulation with micro-spheres and limits applications. Alternatively, high-index spheres or cylinders can be embedded in elastomeric coverslips which can be translated along the investigated samples. However, during this process it is difficult to provide a close contact between the spheres/cylinders and objects required for their optical near-field coupling and super-resolution imaging. Proposed methods and systems solve these problems due to assembling spheres or cylinders in large-scale arrays in such a way that their individual FOV are blended or nearly blended thus creating a giant FOV. It requires assembling monolayers of perfectly ordered arrays of spheres/cylinders which can be achieved by their suction assembly in the micro-hole arrays, as opposed to self-assembly. Proposed methods and systems eliminate a need to translate the coverslips with embedded spheres or cylinders. Just a small, micron-scale positional adjustments are sufficient to image the object of interest that can be achieved by applying a gentle pressure on the entire array to minimize the gap separating the micro-spheres and cylinders from the object. These are key conditions required, as an example, for wide applications of the proposed coverslips with embedded arrays of high-index micro-spheres by pathologists and histologists for medical diagnostics in a clinical environment where they can be used in combination with ordinary optical microscopes.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A super-resolution optical imaging method, comprising:
providing a periodic monolayer array of dielectric spheres or cylinders with a sufficiently small period such that the fields-of-view produced by the spheres or cylinders overlap providing an enlarged field-of-view;
wherein the dielectric spheres or cylinders are fixed in their positions such that the array is adapted to be brought adjacent to a sample to be optically imaged as a whole;
positioning the dielectric spheres or cylinders adjacent to one another in the array by air suction through a periodic micro-hole array providing a monolayer arrangement with a negligible defect rate; and
applying pressure to the array to reduce a gap separating the dielectric spheres or cylinders from the sample to achieve super-resolution imaging with the enlarged field-of-view.

2. The super-resolution optical imaging method of claim 1, further comprising imaging the sample using one of an upright, inverted, white light, fluorescence, confocal, total internal reflection (TIRF), phase contrast, structured illumination (SIM), saturated emission depletion (STED), localization microscopy (STORM or PALM), or super-resolved optical fluctuation imaging (SOFI) microscope system through the array.

3. The super-resolution optical imaging method of claim 1, wherein the periodic monolayer array of dielectric spheres or cylinders is fixed without immersion in a liquid material or embedding in a plastic, elastomeric, or solid material, such that spheres or cylinders form contact micro-lenses in an air environment.

4. The super-resolution optical imaging method of claim 1, wherein the periodic monolayer array of dielectric spheres or cylinders is disposed in a transparent liquid with an ability to solidify such that the spheres or cylinders are fully embedded in a coverslip.

5. The super-resolution optical imaging method of claim 1, wherein the periodic monolayer array of dielectric spheres or cylinders is disposed in a transparent liquid with an ability to solidify such that the spheres or cylinders are partially embedded in a coverslip.

6. The super-resolution optical imaging method of claim 1, wherein the periodic monolayer array of dielectric spheres or cylinders is disposed in a transparent plastic that is heated up to its softening or melting temperature using a thermal press such that the spheres or cylinders are fully embedded in a coverslip.

7. The super-resolution optical imaging method of claim 1, wherein the periodic monolayer array of dielectric spheres or cylinders is disposed in a transparent plastic that is heated up to its softening or melting temperature using a thermal press such that the spheres or cylinders are partially embedded in a coverslip.

8. The super-resolution optical imaging method of claim 1, wherein applying the pressure to the array to reduce the gap separating the dielectric spheres or cylinders from the sample comprises applying mechanical pressure to the array.

9. The super-resolution optical imaging method of claim 1, further comprising depositing a thin layer of metal or a metallic nanostructure operable for enhancing plasmonic near-fields at selected illumination wavelengths on a surface of the substrate to further increase resolution.

10. A super-resolution optical imaging system provided by a method, comprising:
providing a periodic monolayer array of dielectric spheres or cylinders with a sufficiently small period such that the fields-of-view produced by the spheres or cylinders overlap providing an enlarged field-of-view;
wherein the dielectric spheres or cylinders are fixed in their positions such that the array is adapted to be brought adjacent to a sample to be optically imaged as a whole;
positioning the dielectric spheres or cylinders adjacent to one another in the array by air suction through a periodic micro-hole array providing a monolayer arrangement with a negligible defect rate; and applying pressure to the array to reduce a gap separating the dielectric spheres or cylinders from the sample to achieve super-resolution imaging with the enlarged field-of-view.

11. The super-resolution optical imaging system of claim 10, wherein the system is adapted for imaging the sample using one of an upright, inverted, white light, fluorescence, confocal, total internal reflection (TIRF), phase contrast, structured illumination (SIM), saturated emission depletion (STED), localization microscopy (STORM or PALM), or super-resolved optical fluctuation imaging (SOFI) microscope system through the array.

12. The super-resolution optical imaging system of claim 10, wherein the periodic monolayer array of dielectric spheres or cylinders is fixed without immersion in a liquid material or embedding in a plastic, elastomeric, or solid material, such that spheres or cylinders form contact microlenses in an air environment.

13. The super-resolution optical imaging system of claim 10, wherein the periodic monolayer array of dielectric spheres or cylinders is disposed in a transparent liquid with an ability to solidify such that the spheres or cylinders are fully embedded in a coverslip.

14. The super-resolution optical imaging system of claim 10, wherein the periodic monolayer array of dielectric spheres or cylinders is disposed in a transparent liquid with an ability to solidify such that the spheres or cylinders are partially embedded in a coverslip.

15. The super-resolution optical imaging system of claim 10, wherein the periodic monolayer array of dielectric spheres or cylinders is disposed in a transparent plastic that is heated up to its softening or melting temperature using a thermal press such that the spheres or cylinders are fully embedded in a coverslip.

16. The super-resolution optical imaging system of claim 10, wherein the periodic monolayer array of dielectric spheres or cylinders is disposed in a transparent plastic that is heated up to its softening or melting temperature using a thermal press such that the spheres or cylinders are partially embedded in a coverslip.

17. The super-resolution optical imaging system of claim 10, wherein applying the pressure to the array to reduce the gap separating the dielectric spheres or cylinders from the sample comprises applying mechanical pressure to the array.

18. The super-resolution optical imaging system of claim 10, wherein the method further comprises depositing a thin layer of metal or a metallic nanostructure operable for enhancing plasmonic near-fields at selected illumination wavelengths on a surface of the substrate to further increase resolution.

* * * * *